US010974240B2

(12) United States Patent
Webster

(10) Patent No.: US 10,974,240 B2
(45) Date of Patent: Apr. 13, 2021

(54) FLUIDIC CHANNEL FOR A CARTRIDGE

(71) Applicant: QORVO US, INC., Greensboro, NC (US)

(72) Inventor: James Russell Webster, Minnetonka, MN (US)

(73) Assignee: Qorvo US, Inc., Greensboro, NC (US)

( * ) Notice: Subject to any disclaimer, the term of this patent is extended or adjusted under 35 U.S.C. 154(b) by 270 days.

(21) Appl. No.: 16/146,121

(22) Filed: Sep. 28, 2018

(65) Prior Publication Data

US 2020/0009554 A1 Jan. 9, 2020

Related U.S. Application Data

(60) Provisional application No. 62/694,510, filed on Jul. 6, 2018.

(51) Int. Cl.
*B01L 3/00* (2006.01)
*G01N 35/10* (2006.01)

(52) U.S. Cl.
CPC ..... *B01L 3/502707* (2013.01); *B01L 3/50273* (2013.01); *B01L 3/502723* (2013.01); *G01N 35/1095* (2013.01); *B01L 2300/0809* (2013.01); *B01L 2300/14* (2013.01); *B01L 2400/0406* (2013.01); *B01L 2400/0487* (2013.01); *B01L 2400/0694* (2013.01)

(58) Field of Classification Search
CPC ..... B01L 2300/0681; B01L 2300/0809; B01L 2300/14; B01L 2300/161; B01L 2400/0406; B01L 2400/0487; B01L 2400/0688; B01L 2400/0694; B01L 3/5027; B01L 3/502707; B01L 3/502723; B01L 3/50273; G01N 35/1095
See application file for complete search history.

(56) References Cited

U.S. PATENT DOCUMENTS

| 8,222,049 | B2* | 7/2012 | Linder | B01L 3/502784 436/536 |
| 2001/0012612 | A1* | 8/2001 | Petersen | B01L 7/52 435/5 |
| 2005/0150766 | A1* | 7/2005 | Manz | G01N 27/44743 204/452 |
| 2006/0216812 | A1* | 9/2006 | Okada | B01L 3/502715 435/286.5 |
| 2011/0244581 | A1* | 10/2011 | Nikonorov | B01L 3/50273 436/43 |
| 2016/0091506 | A1 | 3/2016 | Webster | |

* cited by examiner

*Primary Examiner* — Jennifer Wecker
(74) *Attorney, Agent, or Firm* — Mueting Raasch Group

(57) ABSTRACT

A cartridge for collecting sample material may include a cartridge body and a fluid reservoir. The cartridge body may define a capless sample well port configured to receive the sample material and a fluidic channel in fluid communication with the capless sample well port. The fluidic channel may include a sample fluidic channel portion and may be configured such that an effect of gravity on the sample material within the sample fluidic channel portion does not overcome a capillary action of the fluidic channel. The fluidic channel may extend between the capless sample well port and the fluid reservoir. The fluidic channel may be configured to direct the sample material towards the fluid reservoir when a pressure is applied within the fluidic channel.

18 Claims, 5 Drawing Sheets

FLUIDIC CHANNEL FOR A CARTRIDGE

RELATED APPLICATIONS

This application claims priority to U.S. Provisional Application Ser. No. 62/694,510, filed on 6 Jul. 2018, the contents of which are incorporated herein in its entirety.

TECHNICAL FIELD

Embodiments of the present disclosure relate generally to bulk acoustic wave (BAW) resonators and their use as biosensors. In particular, the present disclosure relates to cartridges that are configured to receive a sample material and the sample material is contained within the cartridge without capping the sample port.

BACKGROUND

Numerous instruments and measurement techniques exist for diagnostic testing of materials for medical, veterinary medical, environmental, biohazard, bioterrorism, agricultural, and food safety purposes. Diagnostic testing traditionally requires long response times to obtain meaningful data, involves expensive, remote, or cumbersome laboratory equipment, requires large sample size, utilizes multiple reagents, demands highly trained users, and can involve significant direct and indirect costs. For example, in both the human and veterinary diagnostic markets, most tests require that a sample be collected from a patient and then be sent to a laboratory, where the results are not available for several hours or days. As a result, the caregiver must wait to treat the patient.

Point of use (or point of care when discussing human or veterinary medicine) solutions for diagnostic testing and analysis, although capable of solving most of the noted drawbacks, remain somewhat limited. Even some of the point of use solutions that are available, are limited in sensitivity and reproducibility compared to in-laboratory testing. There are also often significant costs involved as separate systems may be needed for different point of use tests.

Further, fluidic devices or cartridges may be configured to receive a sample material and the sample material may be drawn in by capillary force through channels defined by the fluid devices or cartridges. Once the sample material is within the channels, positive or negative pressure may be used to move the sample material within the channels. Typically, the sample port through which the sample material is disposed into the cartridge must be closed (e.g., by capping the sample port). As such, the cap prevents sample material from exiting back through the sample port when pressure is applied to move the sample material within the channels and when the cartridge is transported. However, in some instances, attaching the cap to the sample port may apply a pressure within the channels of the cartridge, which may apply an undesired force upon the sample material. Additionally, a cap attached to the sample port may not be reliable because, e.g., the cap is an additional loose component, the cap may become damaged, etc. However, a cap does serve the purpose of retaining the sample material within the cartridge and prevents the sample material from spilling out of the cartridge.

It would be desirable to provide a cartridge that does not require a cap attached to the sample port after sample material is received within the cartridge such that the sample material may be contained within the cartridge upon physically moving the cartridge. Also, it would be desirable to provide a cartridge that efficiently and effectively controls the volume of sample material within the cartridge needed for testing.

SUMMARY

Embodiments described herein may provide a cartridge including a capless sample well port. In other words, the sample well port that is configured to receive a sample material does not include a cap (e.g., a component configured to seal or cover the sample well port) positioned on or attached to the sample well port (e.g., before, during, and/or after depositing the sample material into the sample well port). Sample material may be deposited through the sample well port and into a fluidic channel defined by the cartridge. The fluidic channel may be arranged such that the cartridge may be oriented or tilted (e.g., up to 90 degrees from a normal orientation in some embodiments) without the sample material exiting through the sample well port or, e.g., traveling to an undesired location within the cartridge. Therefore, when the cartridge is transported with the sample material contained therein (e.g., during the transfer of the cartridge from a benchtop to the instrument after depositing sample material therein), the sample material may not spill out of the cartridge because of any disturbances in orientation of the cartridge. Furthermore, the cartridge may define an overflow fluidic channel portion to uptake excess sample material within the cartridge to, e.g., limit any potential cartridge or instrument contamination.

An illustrative cartridge may include a cartridge body and a fluid reservoir. The cartridge body may define a capless sample well port configured to receive a sample material and a fluidic channel in fluid communication with the capless sample well port. The fluidic channel may include a first fluidic channel portion extending along a first axis and a second fluidic channel portion extending along a second axis. The first axis may be at an angle to the second axis. The fluidic channel may extend between the capless sample well port and the fluid reservoir. The fluidic channel may be configured to direct the sample material towards the fluid reservoir when a pressure is applied within the fluidic channel.

In one or more embodiments, the cartridge may further include a fluid drive port in fluid communication with the fluidic channel. The fluid drive port may be configured to be operably connected to a pressure source such that a positive pressure may be applied within the fluidic channel to direct the sample material towards the fluid reservoir. In one or more embodiments, the first and second fluidic channel portions may define a channel depth of less than or equal to 3 mm and a channel width of less than or equal to 3 mm. In one or more embodiments, the fluidic channel further may include an overflow fluidic channel portion. The overflow fluidic channel portion may be located upstream of a reservoir port of the fluid reservoir. In one or more embodiments, the overflow fluidic channel portion may define a channel depth of less than or equal to 1.5 mm and a channel width of less than or equal to 3 mm.

In one or more embodiments, the first and second fluidic channel portions may extend generally about a first radius of less than or equal to 4 mm from the capless sample well port, and the overflow fluidic channel portion may extend generally about a second radius of less than or equal to 8 mm from the capless sample well port. In one or more embodiments, the fluidic channel may include a third fluidic channel portion. The first fluidic channel portion may be parallel to the third fluidic channel portion. The second fluidic channel portion may be perpendicular to the first and third fluidic channel portions. In one or more embodiments, the cartridge may also include a filter positioned between the capless sample well port and the fluidic channel. In one or more embodiments, the first fluidic channel portion may define a first length and the second fluidic channel portion may define a second length. The first and second lengths may each be less than or equal to 10 mm. In one or more embodiments, the pressure applied within the fluidic channel may be a negative pressure from the fluid reservoir.

Another illustrative cartridge may include a cartridge body and a fluid reservoir. The cartridge body may define a capless sample well port configured to receive a sample material and a fluidic channel in fluid communication with the capless sample well port. The fluidic channel may include a sample fluidic channel portion. The fluidic channel may be configured such that an effect of gravity on the sample material within the sample fluidic channel portion may not overcome a capillary action of the fluidic channel. The fluidic channel may extend between the capless sample well port and the fluid reservoir. The fluidic channel may be configured to direct the sample material towards the fluid reservoir when a pressure is applied within the fluidic channel.

In one or more embodiments, the sample fluidic channel portion may define at least one bend such that the effect of gravity on the sample material within the sample fluidic channel portion may not overcome the capillary action of the fluidic channel. In one or more embodiments, a channel width and a channel depth of the fluidic channel may define the capillary action of the fluidic channel. In one or more embodiments, the cartridge may also include a fluid drive port in fluid communication with the fluidic channel. The fluid drive port may be configured to be operably connected to a pressure source such that a positive pressure is applied within the fluidic channel to direct the sample material towards the fluid reservoir. In one or more embodiments, the sample fluidic channel portion may define a channel depth of less than or equal to 3 mm and a channel width of less than or equal to 3 mm.

In one or more embodiments, the fluidic channel may include an overflow fluidic channel portion. A reservoir port of the fluid reservoir may be positioned between the fluidic channel and the overflow fluidic channel portion. In one or more embodiments, the overflow fluidic channel portion may define a channel depth of less than or equal to 1.5 mm and a channel width of less than or equal to 3 mm. In one or more embodiments, the sample fluidic channel portion may extend generally about a first radius of less than or equal to 4 mm from the capless sample well port, and the overflow fluidic channel portion may extend generally about a second radius of less than or equal to 8 mm from the capless sample well port. In one or more embodiments, the cartridge may also include a filter positioned between the capless sample well port and the fluidic channel. In one or more embodiments, the pressure applied within the fluidic channel may be a negative pressure from the fluid reservoir.

The above summary is not intended to describe each embodiment or every implementation. Rather, a more complete understanding of illustrative embodiments will become apparent and appreciated by reference to the following Detailed Description of Selected Embodiments and Claims in view of the accompanying figures of the drawing.

BRIEF DESCRIPTION OF THE VIEWS OF THE DRAWING

Exemplary embodiments will be further described with reference to the figures of the drawing, wherein.

Figure 1:
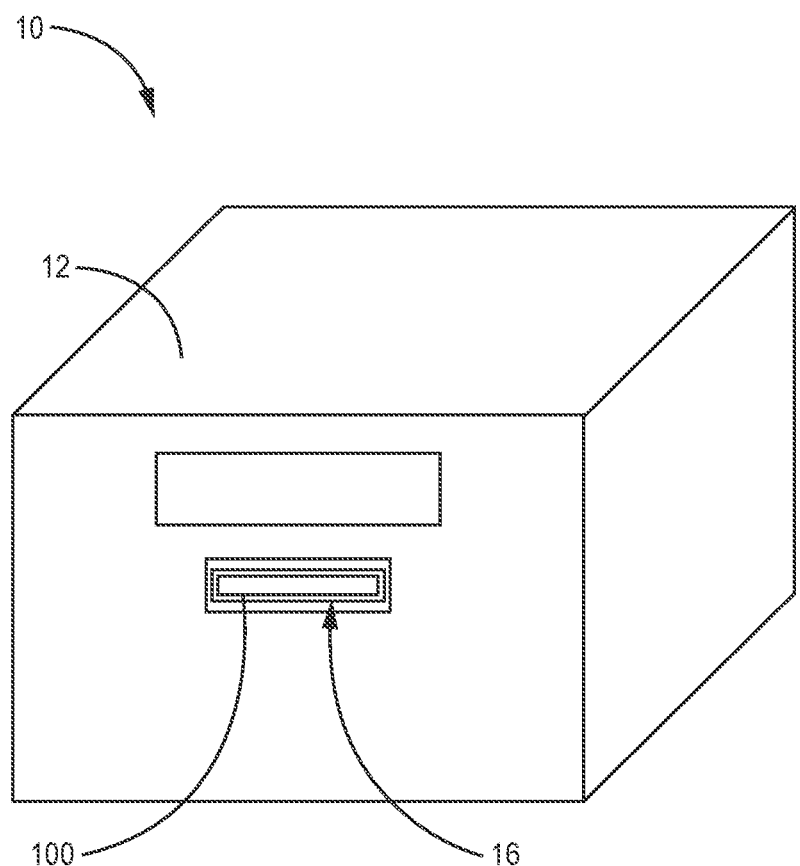
FIG. 1 illustrates a schematic perspective view of a system according to an embodiment.

The figures are rendered primarily for clarity and, as a result, are not necessarily drawn to scale. Moreover, various structure/components may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF SELECTED EMBODIMENTS

In the following detailed description, several specific embodiments of devices, systems and methods are disclosed. It is to be understood that other embodiments are contemplated and may be made without departing from the scope or spirit of the present disclosure. Reference is made to the accompanying figures of the drawing which form a part hereof. It is to be understood that other embodiments, which may not be described and/or illustrated herein, are certainly contemplated. The following detailed description, therefore, is not to be taken in a limiting sense.

The present disclosure relates to bulk acoustic wave (BAW) resonators and their use as biosensors. In particular, the present disclosure relates to devices, such as cartridges, containing bulk acoustic wave resonators and may be used without capping a sample well port through which a sample material is introduced to the cartridge.

As shown schematically in FIG. 1, a cartridge 100 may be used as part of a system 10 with an instrument or reader 12 constructed to receive the cartridge 100. For example, the instrument 12 may define a receptacle 16 configured to receive the cartridge 100 (e.g., the cartridge 100 may be configured to be inserted into the receptacle 16 of the instrument 12). Additionally, the cartridge 100 may be configured to lock or secure into position within the receptacle 16 of the instrument 12. In other words, the cartridge 100 may be configured such that the cartridge 100 cannot fall or slip out of the receptacle 16 after the cartridge 100 has been received by the receptacle 16. In some embodiments, the cartridge 100 and the receptacle 16 may be sized such that there is an interference fit between the cartridge 100 and the receptacle 16 (e.g., friction may help maintain the cartridge 100 attached within the receptacle 16). In other embodiments, the cartridge 100 and the receptacle 16 may include a locking apparatus to maintain a robust connection between the cartridge 100 and the receptacle 16 when the cartridge 100 is received by the receptacle 16. For example, cartridge 100 and the receptacle 16 may interact through a snap hook mechanism, a luer lock, threads, a bayonet mount, a clip, or any other suitable fastener. In one or more embodiments, the instrument 12 may include an active lock (e.g., a motor with linear drive and an electromagnetic brake) to move the cartridge 100 in to and out of the receptacle 16, and also may help to secure the cartridge 100 within the receptacle 16.

The instrument 12 may provide solutions used in sample handling in the cartridge 100, and may be used to read and optionally interpret the results from the BAW sensor in the cartridge 100. The cartridge 100 of the present disclosure embodies the integrated components necessary to convert a BAW resonator, or array of BAW resonators, into a biosensor. This allows for a collection of the tools integrated into a single cartridge that can be tailored for the detection of one or more analytes, such as proteins, DNA, bacteria, fungi, viruses, and other biological or non-biological materials.

The disclosed cartridges can accommodate a large breadth of testing protocols without requiring the platform to be entirely redesigned. The disclosed cartridges may also provide for the use of the same configuration for different protocols, meaning that only the materials would need to be different to afford different protocols to be undertaken with the device. The cartridges may be manufactured with a selectable or interchangeable sensor platform that allows for even more flexibility. For example, the cartridge may include a cartridge boy and a carousel. The cartridges or parts of the cartridges may be reusable, recyclable, or disposable. The cartridges may be offered as "dry" cartridges (e.g., within the cartridge body and, e.g., including a sensor), meaning that no liquid reagents are stored on the device, making the cartridges simpler and more cost-effective to manufacture, and improving storage life of the device. In one or more embodiments, the carousel of the cartridge may contain sealed liquid reagents. However, in other embodiments, the carousel of the cartridge may contain dry reagents. The cartridges are portable and can be used at the sampling location or transported into a laboratory or other secondary site for analysis.

The cartridges of the present disclosure are constructed to receive a liquid sample (e.g., through a sample well port defined by the cartridge body), to at least temporarily store the sample, to provide sample handling and conditioning, and to transfer and meter the sample to a sensor for analysis of one or more parameters of the sample. Examples of typical samples include biological samples, such as urine, plasma, serum, blood, saliva, tears, sweat, and the like, and environmental samples, such as water and aqueous solutions. However, the device can be modified to accommodate various types of fluid samples, and is not particularly limited by sample type.

The cartridges of the present disclosure utilize sensors with bulk acoustic wave (BAW) resonators. According to an embodiment, the cartridge contains a BAW resonator in a fluid flow path. BAW resonators generally include a piezoelectric crystal resonator that can be used to detect changes in material (e.g., changes in the mass of the material) deposited (e.g., bound) on the surface of the resonator or changes in fluid properties (such as viscosity) of a sample. The BAW resonator may have biomolecules, such as antibodies or other proteins such as receptors, or the like, attached to its surface such that when the target analyte passes over the surface, it binds onto the biomolecule. Binding of the analyte the biomolecule attached to the surface of the sensor may increase the mass bound to the sensor, which may alter the wave propagation characteristics (e.g., magnitude, frequency, phase, etc.) of the sensor. The change in propagation characteristics due to analyte binding may be correlated with the amount of bound analyte and, thus, the amount of analyte in the sample. The cartridge may be prepared with various select biomolecules based on the desired target analyte or analytes.

BAW devices typically involve transduction of an acoustic wave using electrodes arranged on opposing top and bottom surfaces of a piezoelectric material. In a BAW device, three wave modes may propagate, namely, one longitudinal mode (embodying longitudinal waves, also called compressional/extensional waves), and two shear modes (embodying shear waves, also called transverse waves), with longitudinal and shear modes respectively identifying vibrations where particle motion is parallel to or perpendicular to the direction of wave propagation. The longitudinal mode is characterized by compression and elongation in the direction of the propagation, whereas the shear modes consist of motion perpendicular to the direction of propagation with no local change of volume. Longitudinal and shear modes propagate at different velocities. In practice, these modes are not necessarily pure modes as the particle vibration, or polarization, is neither purely parallel nor purely perpendicular to the propagation direction. The propagation characteristics of the respective modes depend on the material properties and propagation direction respective to the crystal axis orientations. The ability to create shear displacements is beneficial for operation of acoustic wave devices with fluids (e.g., liquids) because shear waves do not impart significant energy into fluids. BAW devices include bulk acoustic resonators deposited on one or more reflective layers, such as Bragg mirror, and film bulk acoustic resonators having an air-gap.

The BAW sensor described herein may employ any suitable piezoelectric thin film. Certain piezoelectric thin films are capable of exciting both longitudinal and shear mode resonance, such as hexagonal crystal structure piezoelectric materials including (but not limited to) aluminum nitride (AlN) and zinc oxide (ZnO). To excite a wave including a shear mode using a piezoelectric material layer arranged between electrodes, a polarization axis in a piezoelectric thin film is generally non-perpendicular to (e.g., tilted relative to) the film plane. In sensing applications involving liquid media, the shear component of the resonator is preferably used. In such applications, piezoelectric material may be grown with a c-axis orientation distribution that is non-perpendicular relative to a face of an underlying substrate to enable a BAW resonator structure to exhibit a dominant shear response upon application of an alternating current signal across electrodes thereof. Conversely, a piezoelectric material grown with a c-axis orientation that is perpendicular relative to a face of an underlying substrate will exhibit a dominant longitudinal response upon application of an alternating current signal across electrodes thereof.

Figure 2:
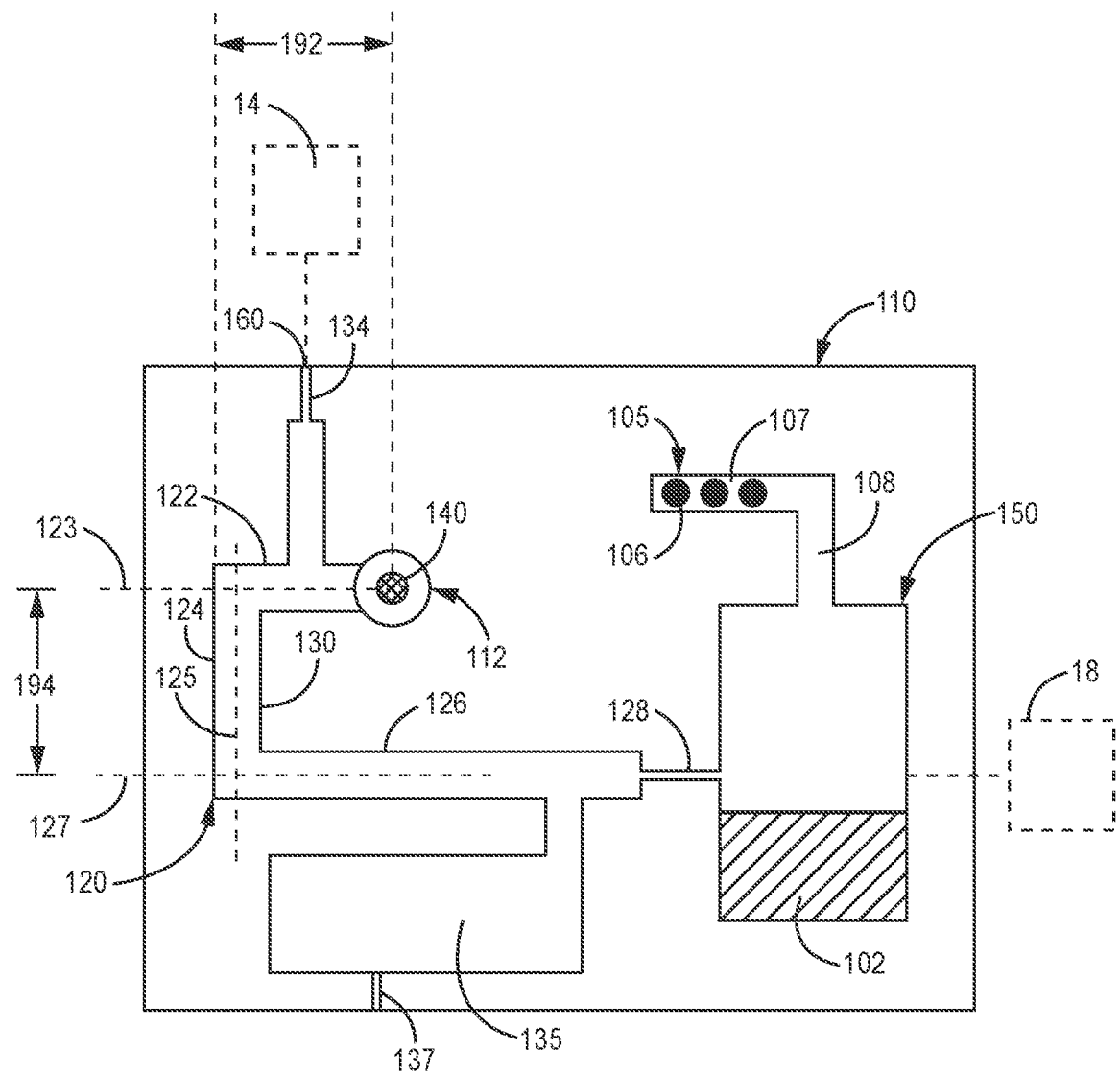
FIG. 2 illustrates a schematic top view of an embodiment of a cartridge in accordance with embodiments of the present disclosure.

An illustrative cartridge 100 including a cartridge body 110 is depicted in FIG. 2. The cartridge body 110 may include a sample well port 112 configured to receive a sample material 102. The sample well port 112 may be any suitable shape and size to assist in directing a sample material 102 into the cartridge 100. The sample well port 112 may be described as a capless sample well port because, e.g., the sample well port 112 may not require or need a cap covering the sample well port 112. A cap may be described herein as a solid material through which gas and/or fluid may not pass. Specifically, the sample well port 112 may remain uncovered or open at all times (e.g., the sample well port 112 may not be sealed closed). In some embodiments, the sample well port 112 or portions of the cartridge body 110 surrounding the sample well port 112 may be configured such that a cap cannot be attached thereto. In other embodiments, the sample well port 112 or portions of the cartridge body 110 surrounding the sample well port 112 may be configured to receive a cap, but a cap is not attached thereto (e.g., before, during, and/or after sample material is disposed within the sample well port 112).

However, in some embodiments, a cap may initially cover the sample well port 112 (e.g., upon delivery of the cartridge 100 to an end-user, prior to depositing the sample material 102 into the sample well port 112, etc.), but the cap may be removed prior to depositing the sample material 102 into the sample well port 112 and no cap (e.g., the initial cap or any other cap) may cover the sample well port 112 thereafter. Further, it may be described that the cartridge 100 may not include a cap covering the sample well port 112 when the cartridge 100 is received by the instrument 12 or during testing of the sample material 102 (e.g., when the cartridge 100 is received by the instrument 12). Further yet, it may be described that the cartridge 100 may not include a cap covering the sample well port 112 after the sample material 102 is received by the sample well port 112 and before the sample material 102 is tested (e.g., when the cartridge 100 is received by the instrument 12).

The sample material 102 may be deposited into the cartridge 100 through the sample well port 112 in any suitable way. For example, the sample material 102 may be added to the cartridge 100 through the sample well port 112 using a disposable dropper, a pipette, a syringe, an adjustable pipette, a fixed volume pipette, a dual-bulb metering dropper, a blood tube transfer device, syringe, a capillary tube, a pipet tube, a plastic spike and vacuum blood collection tube, etc.

The cartridge body 110 may also define a fluidic channel 120 (e.g., microfluidics) in fluid communication with the sample well port 112 and configured to provide a passage for the sample material 102 within the cartridge body 110. For example, sample material 102 that is deposited within the sample well port 112 may disperse into the fluidic channel 120. The fluidic channel 120 may be any suitable passageway through which a fluid (e.g., the sample material 102) may travel. The fluidic channel 120 may be configured to provide a capillary action on the sample material 102 passing through the fluidic channel 120. In other words, the fluidic channel 120 may draw sample material 102 into the cartridge 100 through capillary action of the fluidic channel 120, e.g., without the use of an auxiliary device to force sample material through the sample well port 112.

The fluidic channel 120 may exhibit the capillary action due to one or both of a hydrophilic material or coating of the fluidic channel 120 and the dimensions of the fluidic channel 120. For example, in one or more embodiments, at least one surface of the fluidic channel 120 may be made from or coated with hydrophilic material to optimize or control the ability for fluids to flow through the fluidic channel 120. As such, the at least one surface of the fluidic channel 120 may attract (e.g., through a wicking effect or capillary action) fluid (e.g., the sample material 102) such that the fluid travels along the fluidic channel 120. Further, the fluidic channel 120 may be dimensioned such that fluid (e.g., the sample material 102) may be contained by the fluidic channel 120 (e.g., due to surface tension forces) as well as flow along the fluidic channel 120. In other words, the capillary action characteristics of the fluidic channel 120 may cause the sample material 102 to disperse within empty volumes of the fluidic channel 120, but also prevent the sample material 102 from exiting the fluidic channel 120 (e.g., without an external pressure being applied within the fluidic channel 120).

The fluidic channel 120 may include a sample fluidic channel portion 130 configured to receive and hold the sample material 102 before the sample material 102 may be tested. Further, the sample fluidic channel portion 130 may be configured such that sample material 102 may be contained therein (e.g., prevented from exiting back through the sample well port 112) due to the capillary action of the fluidic channel 120. For example, an effect of gravity on the sample material 102 within the fluidic channel 120 may not overcome the capillary action of the fluidic channel 120. Specifically, based on the dimensions and arrangement of multiple portions of the fluidic channel 120, the effect of gravity on the sample material 102 in any one portion of the fluidic channel 120 may not overcome the capillary action of that portion of the fluidic channel 120.

The capillary draw on the sample material 102 within the fluidic channel 120 may be calculated based on, e.g., vertical distance of the sample material 102, a pressure at the fluid source, and a gravitational force. For example, with regards to capillary rise or draw, there may a pressure equalization between a capillary pressure (e.g., a negative pressure because the sample material 102 is drawn into the capillary), a pressure at the fluid source (e.g., atmospheric pressure), and a pressure due to gravity (e.g., density×acceleration of gravity×vertical height). Specifically, the equation may be: $P_{capillary} = P_{source} - \rho g h$.

Therefore, a channel of sample material 102 extending generally in a vertical direction may produce a larger downward force (e.g., due to the effect of gravity) than the same channel of sample material 102 extending generally in a horizontal direction. Additionally, a channel of sample material 102 that is longer than another channel of sample material 102 (with an equivalent cross-sectional area), when oriented generally along a vertical direction, may produce a larger downward force because of, e.g., the greater effect of gravity due to the increased vertical distance or height. As such, to minimize the effect of gravity on the sample material 102 (e.g., relative to the capillary action of the channel), the fluidic channel 120 may have two or more portions oriented in different directions and containing only a fraction of the overall volume of sample material 102 in any one portion (e.g., two channel portions, each containing about half of the total volume of sample material 102).

Therefore, in one or more embodiments, the sample fluidic channel portion 130 described herein may define at least one bend or angle such that the effect of gravity on the sample material 102 within the sample fluidic channel portion 130 may not overcome the capillary action of the fluidic channel 120. In other words, the overall downward force on the sample material 102 may be minimized such that it may not overcome the capillary action of a portion of the fluidic channel 120. For example, the at least one bend or angle may form multiple portions of the sample fluidic channel portion 130 that are oriented differently thereby decreasing the effect of gravity on the sample material 102 in any one portion of the sample fluidic channel portion 130.

Therefore, when the cartridge 100 is tilted or tipped in any direction, the effect of gravity in any one portion of the fluidic channel 120 may not overcome the capillary action for that portion of the fluidic channel 120. Because the effect of gravity on the sample material 102 may not overcome the capillary action for the fluidic channel 120, the sample material 102 may not leak or spill out or exit the cartridge through the sample well port 112 (e.g., because, if not for the capillary action, the sample material 102 may be forced through the fluidic channel 120 in a direction towards the sample well port 112). For example, if the cartridge 100 is oriented such that one portion of the fluidic channel 120 is generally vertical, that portion of the fluidic channel 120 may be dimensioned (e.g., the channel depth, the channel width, and the channel length) such that the sample material 102 may be retained (e.g., without moving or limited movement) within the fluidic channel 120 (e.g., the force or effect of gravity on the sample material does not overcome the capillary action of the fluidic channel 120). The cartridge 100 described herein may be oriented up to 90 degrees, up to 60 degrees, or up to 30 degrees from a normal resting position (e.g., such that a bottom surface 101, illustrated in FIG. 3, of the cartridge 100 may be resting on a horizontal surface in the normal resting position).

As a result, any one portion of the fluidic channel 120 may define a channel depth of greater than or equal to 0.5 mm, greater than or equal to 1 mm, greater than or equal to 1.5 mm, etc. and/or less than or equal to 3 mm, less than or equal to 2.5 mm, less than or equal to 2 mm, etc., and a channel width of greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. Specifically, any one portion of the fluidic channel 120 may define a channel depth of about 1.6 mm, a channel width of about 2.57 mm, and a channel length of about 25 mm. Further, it is noted that the fluidic channel 120 may define a rectangular cross-sectional shape or a non-rectangular cross-sectional shape (e.g., a tapered shape, a triangular shape, a rounded shape, etc.). The fluidic channel 120 may define a channel length of greater than or equal to 10 mm, greater than or equal to 20 mm, greater than or equal to 25 mm, etc. and/or less than or equal to 50 mm, less than or equal to 40 mm, less than or equal to 30 mm, etc. and the volume of the fluidic channel 120 may be about greater than or equal to 80 uL, greater than or equal to 90 uL, greater than or equal to 100 uL, etc. and/or less than or equal to 120 uL, less than or equal to 110 uL, less than or equal to 105 uL, etc.

The fluidic channel 120 may include any number of portions that form the fluidic channel 120. For example, the fluidic channel 120 may include a first fluidic channel portion 122 extending along a first axis 123 and a second fluidic channel portion 124 extending along a second axis 125. In one or more embodiments, the first axis 123 may extend in a different direction than the second axis 125. Specifically, the first axis 123 and the second axis 125 may be at an angle relative to one another of about 15 degrees, about 30 degrees, about 45 degrees, about 60 degrees, about 90 degrees, etc. For example, the first axis 123 may be at an angle to the second axis 125. Further, the fluidic channel 120 may include a third fluidic channel portion 126 extending along a third axis 127. In one or more embodiments, the first fluidic channel portion 122 (e.g., the first axis 123) may be parallel to the third fluidic channel portion 126 (e.g., the third axis 127), and the second fluidic channel portion 124 (e.g., the second axis 125) may be perpendicular to the first and third fluidic channel portions 122, 126 (e.g., the first and third axes 123, 127).

Each of the portions that form the fluidic channel 120 may define a capillary action for a fluid (e.g., the sample material 102) contained therein due to the dimensions of the corresponding portion. For example, the sample fluidic channel portion 130 (e.g., the first, second, and third fluidic channel portions 122, 124, 126) may define a channel depth of about greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. (e.g., channel depth 182 illustrated in FIG. 5) and a channel width of about greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. (e.g., channel width 183 illustrated in FIG. 5). Any other portion of the fluidic channel 120 (e.g., the second fluidic channel portion 124 and the third fluidic channel portion 126) may define a channel depth and a channel width similar to that of the first fluidic channel portion 122.

Furthermore, each of the portions that form the fluidic channel 120 may define a length measured along a corresponding axis of the portion. For example, the first fluidic channel portion 122 may define a first length 192 (e.g., measured along the first axis 123) of about greater than or equal to 2 mm, greater than or equal to 4 mm, greater than or equal to 6 mm, etc. and/or less than or equal to 10 mm, less than or equal to 8 mm, less than or equal to 5 mm, etc. and the second fluidic channel portion 124 may define a second length 194 (e.g., measured along the second axis 125) of about greater than or equal to 2 mm, greater than or equal to 4 mm, greater than or equal to 6 mm, etc. and/or less than or equal to 10 mm, less than or equal to 8 mm, less than or equal to 5 mm, etc.

Figure 5:
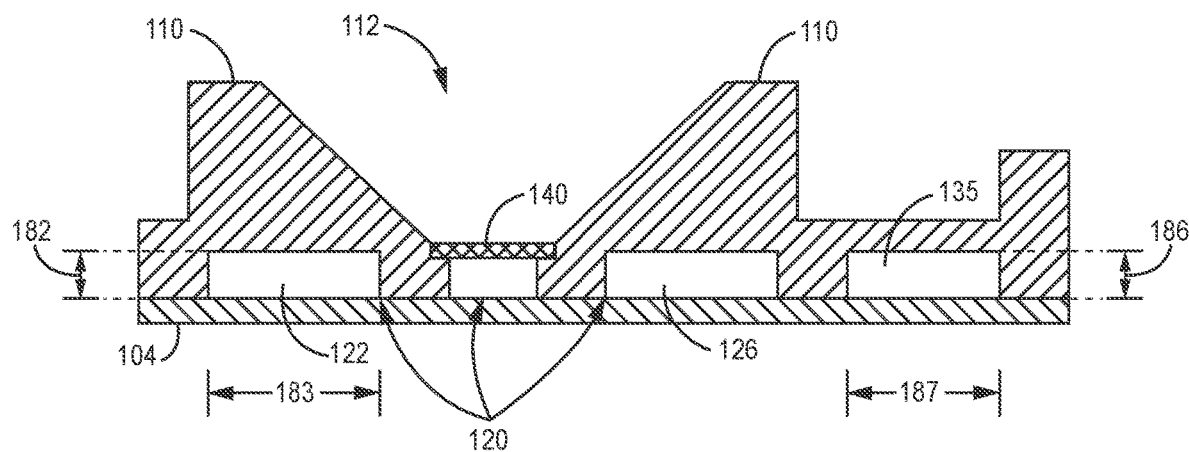
FIG. 5 illustrates another cross-sectional view of the cartridge of FIG. 3, taken across line 5-5'.

Further, as shown in FIG. 5, the overflow fluidic channel portion 135 may define a channel depth 186 of about greater than or equal to 0.5 mm, greater than or equal to 0.75 mm, greater than or equal to 1 mm, etc. and/or less than or equal to 2 mm, less than or equal to 1.5 mm, less than or equal to 1.25 mm, etc. and a channel width 187 of about greater than or equal to 0.5 mm, greater than or equal to 1 mm, greater than or equal to 1.5 mm, etc. and/or less than or equal to 3 mm, less than or equal to 2.5 mm, less than or equal to 2 mm, etc. Specifically, the overflow fluidic channel portion 135 may define a channel depth 186 of about 1.016 mm and a channel width of about 2.07 mm.

Further, the cartridge 100 may include a fluid reservoir 150 (e.g., a sample well) configured to collect sample material 102 to be tested. In one or more embodiments, the fluid reservoir 150 may be defined by a carousel (e.g., which may be detachable from the cartridge body 100, which may rotate relative thereto, etc.). The fluidic channel 120 may extend between the sample well port 112 and the fluid reservoir 150. The fluid reservoir 150 may include a reservoir port 152 along the fluidic channel 120 (e.g., at an end of the sample fluidic channel portion 130) to place the fluid reservoir 150 in fluid communication with the fluidic channel 120. The fluid reservoir 150 may define a total volume of any suitable size. Specifically, the fluid reservoir 150 may define a total volume of less than or equal to 1 mL, 500 uL, 100 uL, 50 uL, 10 uL, etc. A pressure may be applied within the fluidic channel 120 (e.g., a pneumatic or hydraulic pressure) to force the sample material 102 out of the fluidic channel 120 and into the fluid reservoir 150. Additionally, in one or more embodiments, the fluid reservoir 150 may include a reservoir vent 154 configured to relieve any pressure from within the fluid reservoir 150. For example, the reservoir vent 154 may include a hydrophobic material such that a liquid (e.g., the sample material 102) may be prevented from passing through the reservoir vent 154 and, e.g., out of the fluid reservoir 150. In such embodiments in which the fluid reservoir 150 is defined by a carousel, wells defined within the carousel may be open (e.g., to allow for venting).

In one or more embodiments, the fluidic channel 120 may also include an overflow fluidic channel portion 135 (e.g., an overflow reservoir) to help direct excess sample material 102 away from the fluidic channel 120 (e.g., to prevent the sample well port 112 from overflowing). The overflow fluidic channel portion 135 may be in fluid communication with the sample fluidic channel portion 130 and positioned along the sample fluidic channel portion 130 between the sample well port 112 and the fluid reservoir 150. In some embodiments, the overflow fluidic channel portion 135 may be positioned upstream (e.g., relative to the direction of pressure applied within the fluidic channel 120) of the reservoir port 152 of the fluid reservoir 150. The overflow fluidic channel portion 135 may assist in collecting extraneous sample material 102 after the fluidic channel 120 is "filled" with sample material 102. In one or more embodiments, the overflow fluidic channel portion 135 may include an overflow vent 137 (e.g., including a hydrophobic membrane inline) that allows air or gases, but not fluids, to escape the overflow fluidic channel portion 135 in order to, e.g., equalize pressure within the overflow fluidic channel portion 135. The overflow vent 137 may include a hydrophobic membrane to prevent fluid from passing through the overflow vent 137. Additionally, in one or more embodiment, the overflow vent 137 may act as a capillary stop (e.g., connected through overflow port 139 illustrated in FIG. 4) to prevent fluid from passing out of the overflow fluidic channel 135. Therefore, the overflow fluidic channel 135 may not fill past the overflow port 139. When in operation, the overflow port 139 may be closed such that air passing through the fluidic channel 120 pushes sample material 102 into the fluid reservoir 150 and not through the overflow port 139 (e.g., by inserting the cartridge 100 within the receptacle 16, the instrument 12 may be configured to close the overflow port 139).

Further yet, the cartridge 100 may include a fluid drive port 160 in fluid communication with the fluidic channel 120. The fluid drive port 160 may be configured to be operably connected to a pressure source 14 (e.g., a displacement pump) such that a pressure may be applied within the fluidic channel 120 to direct the sample material 102 towards and into the fluid reservoir 150. In FIG. 2, the pressure source 14 is illustrated in broken lines because the pressure source 14 may be positioned within the instrument 12 such that the pressure source 14 may only be operably connected with the cartridge 100 when the cartridge 100 is inserted into the instrument 12.

In one or more embodiments, the sample well port 112 may be located between the fluid drive port 160 and the fluid reservoir 150. In other words, the fluid drive port 160 may be positioned upstream (e.g., according to the direction of applied pressure from the fluid drive port 160 to the fluid reservoir 150) of the sample well port 112. Further, in one or more embodiments, the sample well port 112 may be located closer to the fluid drive port 160 than the fluid reservoir 150. The location of the sample well port 112 closer to the fluid drive port 160 may minimize the amount of sample material 102 that may go untested because, e.g., the sample material 102 from the fluidic channel 120 may be forced to fluid reservoir 150 and the sample material 102 located between the sample well port 112 and the fluid drive port 160 may not.

In one or more embodiments, the fluidic channel 120 may include a first capillary stop 134 located proximate the fluid drive port 160 (e.g., between the remainder of the fluidic channel 120 and the fluid drive port 160) and a second capillary stop 128 located proximate the fluid reservoir 150 (e.g., between the remainder of the fluidic channel 120 and the fluid reservoir 150). The first and second capillary stops 134, 128 may be configured to prevent the sample material 102 from passing through the capillary stops 134, 128 without a predetermined pressure applied (e.g., due to surface tension forces). For example, the first and second capillary stops 134, 128 may be configured to allow the sample material to pass therethrough at a pressure greater than or equal to 400 Pa, greater than or equal to 500 Pa, greater than or equal to 600 Pa, etc. As a result, the sample material 102 may be prevented from entering the fluid drive port 160 or the fluid reservoir 150 (e.g., only remaining within the fluidic channel 120) when a pressure is not applied within the fluidic channel 120 (e.g., because of the first and second capillary stops 134, 128).

The first and second capillary stops 134, 128 may define the pressure at which fluid may pass through the capillary stop due to the dimensions of each of the first and second capillary stops 134, 128. For example, each of the first and second capillary stops 134, 128 may define a channel having a width of about greater than or equal to 50 um, greater than or equal to 100 um, greater than or equal to 200 um, greater than or equal to 300 um, etc. and/or less than or equal to 600 um, less than or equal to 500 um, less than or equal to 400 um, less than or equal to 250 um, etc. Also, for example, each of the first and second capillary stops 134, 128 may define a depth of about greater than or equal to 50 um, greater than or equal to 100 um, greater than or equal to 200 um, greater than or equal to 300 um, etc. and/or less than or equal to 600 um, less than or equal to 500 um, less than or equal to 400 um, less than or equal to 250 um, etc. Further, a length of the first and second capillary stops 134, 128 may have no bearing on the pressure of the stop (e.g., to establish a fluid pressure needed to pass through the capillary stop). In one or more embodiments, the capillary stops may define a hole (e.g., defining a diameter of about 400 um) between channels/reservoirs of the cartridge to create a capillary stop therebetween.

Upon use of the cartridge 100, a user may add sample material 102 through the sample well port 112 until the sample material fills the fluidic channel 120 and reaches the second capillary stop 128. Therefore, the volume of the sample material 102 delivered from the fluidic channel 120 to the fluid reservoir 150 may be controlled or defined by the volume of the fluidic channel 120 between the first and second capillary stops 134, 128. In other words, because the sample material may be prevented from entering the first and second capillary stops 134, 128 without an applied pressure (e.g., greater than or equal to 500 Pa), the amount of sample material 102 is limited by the volume defined by the fluidic channel 120. After the fluidic channel 120 is filled with sample material 102, if the user attempts to add additional sample material 102, the additional sample material 102 may remain in the sample well port 112 (if, e.g., the cartridge 100 does not include an overflow fluidic channel or reservoir) because the pressure applied simply from adding sample material 102 to the sample well port 112 does not exceed the pressure barrier of the first or second capillary stops 134, 128 (e.g., does not exceed 500 Pa).

In one or more embodiments, the exact amount of sample material 102 needed within the cartridge 100 may not need to be known because the cartridge 100 may include a visual indication for which a user may look for when filling the sample well port 112. In other words, a user may not need to be trained on the precise volume of sample material 102 to be deposited in the cartridge 100. Instead, the cartridge 100 may operate within a range of sample volume 102 applied therein. Therefore, the cartridge 100 may include a visual indication with, e.g., two prescribed limits. For example, the visual indication may include a fill line that may provide visual feedback to the user as to the proper and adequate fluid delivery within the fluidic channel 120. Further, any excess sample material 102 added to the cartridge 100 (e.g., above the volume capacity of the sample fluidic channel portion 130) may be drawn into the overflow fluidic channel portion 135. After the cartridge 100 is inserted into the instrument 12, a port connecting the overflow fluidic channel portion 135 to the sample fluidic channel portion 130 may close to prevent any excess fluid located within the overflow fluidic channel portion 135 from being pushed into the fluid reservoir 150 when a pressure is applied within the fluidic channel 120.

In one or more embodiments, the fill line may be positioned proximate the capillary stop 128 between the fluidic channel 120 and the fluid reservoir 150 such that the user may visually inspect that the sample material 102 has filled the fluidic channel 120 (e.g., the sample material 102 is present within the fluidic channel 120 between the sample well port 112 and the second capillary stop 128). Specifically, the fill line may include a transparent section of the cartridge body 110 that provides a window into the fluidic channel 120.

The cartridge 100 may also include a filter 140 positioned between the sample well port 112 and the fluidic channel 120 (e.g., as shown in FIG. 5). The filter 140 may be positioned such that the sample material 102 deposited within the sample well port 112 wicks through the filter 140 and into the fluidic channel 120. In other words, the sample well port 112 may be configured such that the filter 140 may be in the bottom of the sample well port 112 and the fluidic channel 120 is located below the filter 140 to uptake the sample material 102.

In one or more embodiments, the filter 140 may provide a coarse filter of the sample material 102 (e.g., filtering out particulates that are greater than or equal to 20 micrometers). For example, the filter 140 may define a pore size of less than or equal to 60 micrometers, less than or equal to 40 micrometers, less than or equal to 20 micrometers, etc. and/or greater than or equal to 0.5 micrometers, greater than or equal to 1 micrometer, greater than or equal to 2 micrometers, etc. Further, the filter 140 may define a bubble point of less than or equal to 4,500 Pa, less than or equal to 4,000 Pa, less than or equal to 3,500 Pa, etc. and/or greater than or equal to 1,000 Pa, greater than or equal to 2,000 Pa, greater than or equal to 3,000 Pa, etc. The bubble point of the filter 140 may be described as the pressure barrier above which gas (e.g., air) may be pushed through the filter 140. Therefore, when a pressure (e.g., pneumatic pressure) is applied within the fluidic channel 120 to move the sample material 102, the pneumatic pressure is contained within the fluidic channel 120 as long as the pneumatic pressure stays below the bubble point of the filter 140 (e.g., below 4,000 Pa).

In one or more embodiments, the fluid drive port 160 may be configured to be operably connected to (e.g., in fluid communication with) a pressure source 14 when the cartridge 100 is inserted into the instrument 12. For example, a pump (e.g., the pressure source 14) of the instrument 12 may be aligned with the fluid drive port 160 when the cartridge is inserted into the instrument 12 such that that the pressure source 14 may apply a pressure within the fluidic channel 120 via the fluid drive port 160. In one or more embodiments, the pressure source 14 used to apply a pressure through the fluid drive port 160 may utilize existing pumps, valves and ports already present in the cartridge 100. In other words, in some embodiments, no additional fluid pumps, valves, or ports that are solely dedicated to the applying a pressure within the fluidic channel 120 of the cartridge 100 may be required.

The pressure source 14 may apply a pressure through the fluid drive port 160 to apply a positive pressure (e.g., pressure applied upstream of the fluid reservoir 150) within the fluidic channel 120. The pressure source 14 may be configured (e.g., through the use of a metering valve) such that the pressure through the fluid drive port 160 may be selectively controlled to take into account, e.g., other characteristics of the cartridge 100. For example, the pressure applied within the fluidic channel 120 may be such that the pressure barriers of each of the first and second capillary stops 134, 128 may be overcome and the pressure applied within the fluidic channel 120 may be below the bubble point of the filter 140 (e.g., the pressure may not be high enough to force gas through the filter 140). Specifically, the pressure applied within the fluidic channel 120 (e.g., via the fluid drive port 160) may be greater than or equal to 500 Pa (e.g., based on the pressure barrier of the capillary stops) and less than or equal to 4,000 Pa (e.g., based on the bubble point of the filter 140).

Therefore, gas from the pressure source 14 may not pass through the wetted filter 140 and, instead, may only apply a pressure on the sample material 102 in a direction towards and into the fluid reservoir 150. Additionally, in one or more embodiments, the sample material 102 may be forced back through the filter 140 and into the sample well port 112, but as described above, gas from the pressure source 14 may not pass through the filter 140. Thereafter, any excess sample material 102 in the sample well port 112 may be allowed to wick into the fluidic channel 120. As such, the filter 140 may effectively act as a seal for gas but not fluid (e.g., because the pore size of the filter 140 allows for the transfer of fluid therethrough).

The pore size of the filter 140 may be selected such that the pore size is large enough to allow sample material 102 to pass therethrough, but small enough for the filter 140 to prevent gas to pass therethrough as it pertains to a pneumatic pressure applied within the fluidic channel 120. Therefore, the pore size of the filter 140, which corresponds to a bubble point of the filter 140, may be selected to balance the desire to allow the sample material 102 to pass through and prevent gas from passing through. Further, the pressure required to overcome the capillary stops of the fluidic channel 120 combined with the bubble point of the filter 140 may create a range of pressures (e.g., between 500 Pa and 4,000 Pa) that may be applied within the fluidic channel 120 to effectively move the sample material 102.

In some embodiments, the instrument 12 may include a negative pressure source 18 located downstream of the fluidic channel 120 and the fluid reservoir 150. In FIG. 2, the negative pressure source 18 is illustrated in broken lines because the negative pressure source 18 may be positioned within the instrument 12 such that the negative pressure source 18 may only be operably connected with the cartridge 100 when the cartridge 100 is inserted into the instrument 12. Further, in some embodiments, the negative pressure source 18 may or may not be included in the system 10. The negative pressure source 18 may apply a vacuum or suction to the fluidic channel 120 to move the sample material 102 into the fluid reservoir 150 (and, e.g., to overcome the second capillary stop 128). In such embodiments that include a negative pressure source 18, the cartridge 100 may include a filter 140 positioned between the sample well port 112 and the fluidic channel 120. However, in some embodiments that include a negative pressure source 18, the cartridge 100 may not include a filter 140 positioned between the sample well port 112 and the fluidic channel 120 (e.g., because fluid or gas is not forced toward the sample well port 112 when using the negative pressure source 18).

Additionally, the cartridge 100 may include a bulk acoustic wave resonator sensor 105 as described herein. The bulk acoustic wave resonator sensor 105 may include a bulk acoustic wave resonator 106 having a sensing surface 107 (e.g., an analyte-binding surface). Additionally, the cartridge 100 may include a fluid flow path 108 extending between the fluid reservoir 150 and the sensing surface 107. The resonator sensor 105 depicted in FIG. 2 includes a plurality of bulk acoustic wave resonators 106 located in a fluid flow path 108 through which an acquired sample material 102 may flow. The sensor 105 may have one or more electronic components to drive the resonators 106 into oscillating motion and measure a change in an oscillation characteristic of the resonator 106 as the sample material 102 is passed over the sensing surface 107 of the resonators 106. In addition or alternatively, one or more electronic components for driving and sensing a response from the resonators 106 may be external to the cartridge 100, such as on an instrument 12 depicted in FIG. 1. The instrument 12 or other suitable external device may be electrically coupled to the sensor 105 in any suitable way (e.g., when the cartridge 100 is inserted into the receptacle 16 of the instrument 12). Further, the resonators 106 of the sensor 105 may be used for a variety of different suitable purposes. For example, one or more sensors 105 may be used in a control group or to provide redundancy.

In one or more embodiments, the system 10 may include a controller (e.g., located within the instrument 12) configured to control the pressure source 14 that may be present in the system. The methods and/or logic described in this disclosure, including those attributed to the system 10, or various constituent components (e.g., the controller 26), may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry. Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

When the cartridge 100 is operably coupled to external equipment of the system 10 (e.g., within the instrument 12), the sensor 105 may be electrically coupled to the controller. The sensor 105, external device, and controller include one or more electronic components to drive the resonators 106 into oscillating motion and measure a change in an oscillation characteristic of the resonator 106 as the sample material 102 is passed over the sensing surface 107 of the resonators 106.

Figure 3:
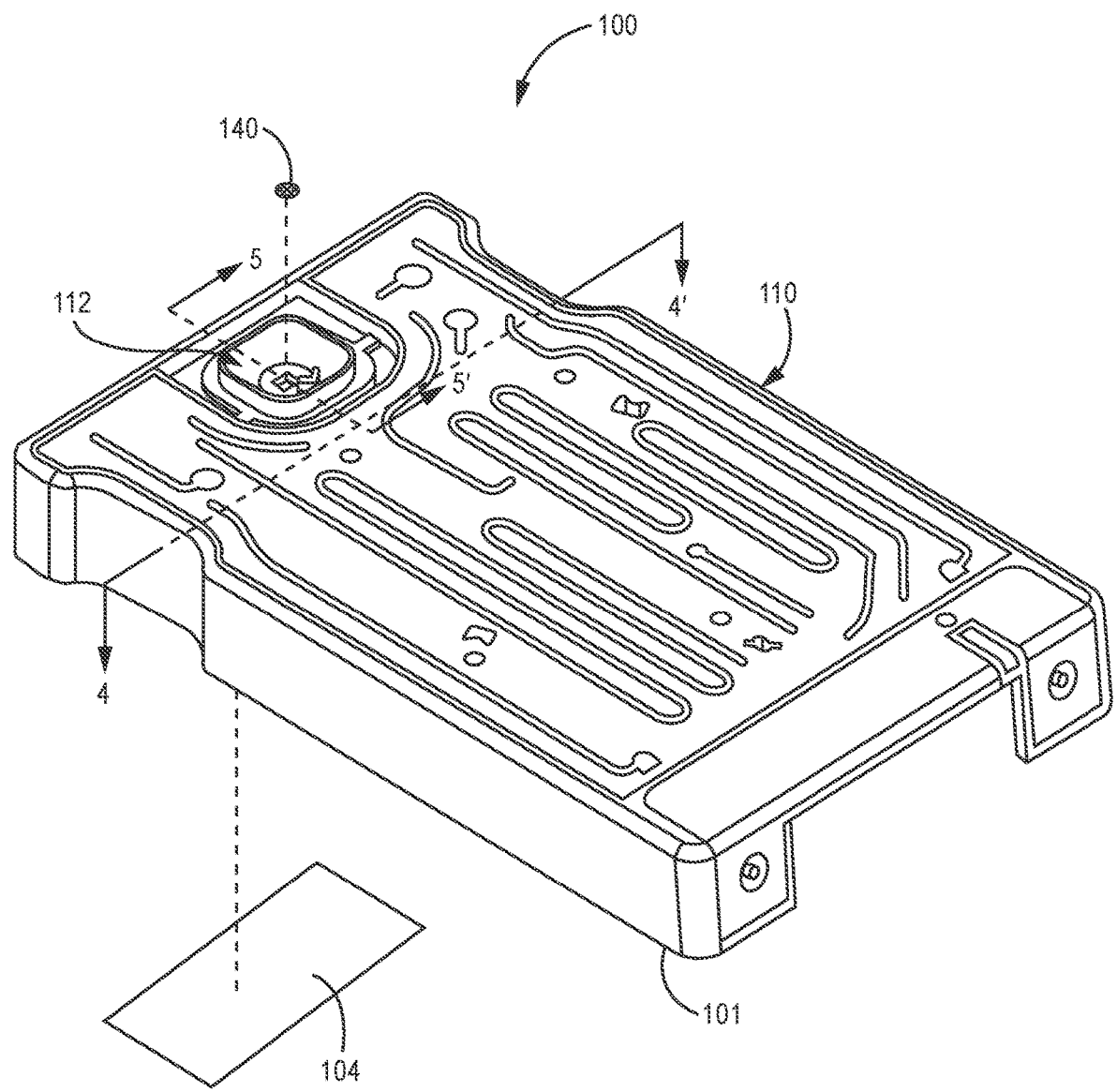
FIG. 3 illustrates a perspective view of an embodiment of a cartridge in accordance with embodiments of the present disclosure.
Figure 4:
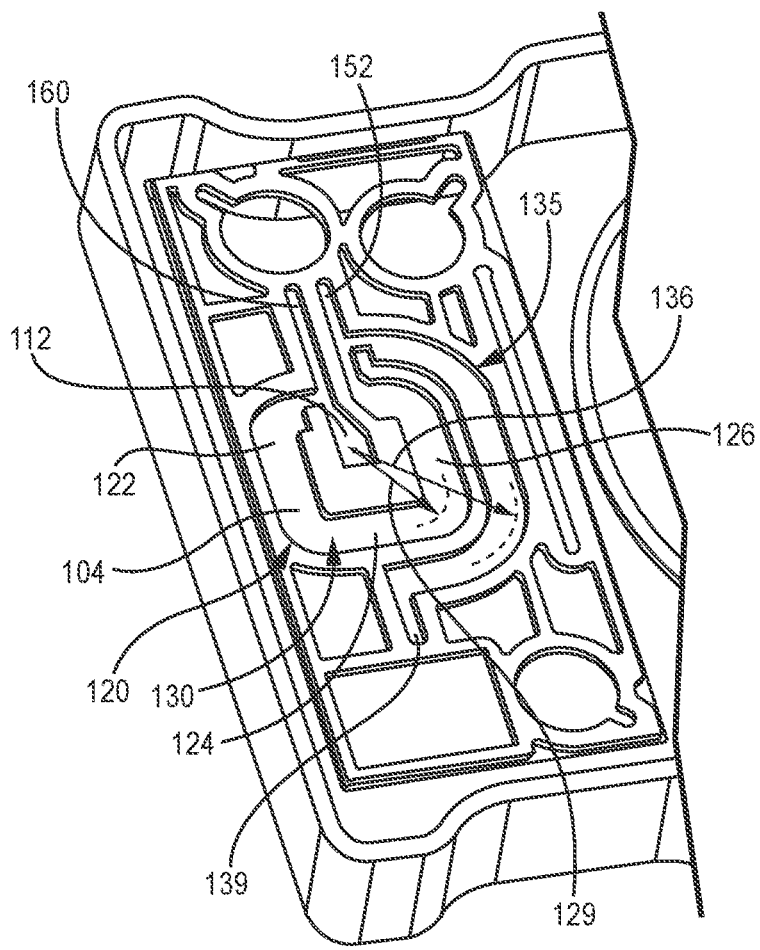
FIG. 4 illustrates a cross-sectional view of the cartridge of FIG. 3, taken across line 4-4', depicting an illustrative fluidic channel.

A specific embodiment of an illustrative cartridge 100 is depicted in FIGS. 3-5. The cartridge 100 may include any of the components or features described above with regards to the cartridge illustrated in FIGS. 1 and 2. As shown in FIG. 3, the cartridge 100 includes a cartridge body 110 defining a sample well port 112. Further, the cartridge 100 may include a filter 140 positioned within the sample well port 112, for example, between the sample well port 112 and the fluidic channel 120 (e.g., as illustrated in FIGS. 4 and 5).

Additionally, as will be described further herein, the cartridge 100 may include a fluidic channel membrane 104 that may be, e.g., attached to the bottom of the cartridge body 110 to form at least one surface of the fluidic channel 120 (e.g., as shown in FIGS. 4 and 5). For example, the fluidic channel membrane 104 may be formed of an adhesive or tape. Further, the fluidic channel membrane 104 may be made from or coated with hydrophilic materials to optimize or control the ability for fluids to flow through the fluidic channel 120. Specifically, the fluidic channel membrane 104 may be a polyethylene terephthalate (PET) substrate with a hydrophilic pressure sensitive adhesive.

A detailed view of the passages defined by the fluidic channel 120 of the cartridge 100 is illustrated in FIG. 4 (e.g., a cross-sectional view of the cartridge 100 of FIG. 3 taken across line 4-4'). As shown, the fluidic channel 120 extends between the sample well port 112 and a reservoir port 152 that is in fluid communication with the fluid reservoir (e.g., similar to the fluid reservoir 150 illustrated in FIG. 2). The fluidic channel portion 120 may include a sample fluidic channel portion 130 and an overflow fluidic channel portion 135. The sample fluidic channel portion 130 may be configured to collect and store sample material 102 prior to the sample material 102 being tested. Further, the overflow fluidic channel portion 135 (e.g., an overflow reservoir) may be in fluid communication with the sample fluidic channel portion 130 and configured to receive any excess sample material 102 from the sample fluidic channel portion 130. Further, the overflow fluidic channel 135 may define a volume of about 40 uL. In one or more embodiments, the overflow fluidic channel 135 may include an overflow port 139 configured to help vent the overflow fluidic channel 135. In one or more embodiments, the overflow port 139 may be blocked or prevented from allowing air or fluid to pass through when the cartridge 100 is positioned within the instrument 12. In such embodiments, the overflow port 139 may be restricted so that when a pressure is applied to the fluidic channel 120, the sample material 102 may travel into the fluid reservoir 150 and may not be forced through the overflow port 139. Further, any sample material 102 located within the overflow fluidic channel 135 remains in the overflow fluidic channel 135 (e.g., because it may be prevented from exiting through the overflow port 139 and may not be pulled into the fluid reservoir 150).

The sample fluidic channel portion 130 may include multiple portions oriented a variety of different directions. For example, the sample fluidic channel portion 130 may include a first fluidic channel portion 122, a second fluidic channel portion 124, and a third fluidic channel portion 126. The first fluidic channel portion 122 may be in fluid communication between the sample well port 112 and the second fluidic channel portion 124, the second fluidic channel portion 124 may be in fluid communication between the first fluidic channel portion 122 and the third fluidic channel portion 126, and the third fluidic channel portion 126 may be in fluid communication with the second fluidic channel portion 124, the reservoir port 152, and the overflow fluidic channel portion 135. Further, the fluidic channel 120 may extend between the sample well port 112 and the reservoir port 152 in any suitable way. For example, as shown in FIG. 4, the fluidic channel 120 extends along a circular path around the sample well port 112 (e.g., the fluidic channel 120 may be described as "wrapped" around the sample well port 112). Specifically, the sample fluidic channel portion 130 (e.g., the first, second, and third fluidic channel portions 122, 124, 126 of FIG. 4) may extend generally about a first radius 129 of about greater than or equal to 3 mm, greater than or equal to 4 mm, etc. and/or less than or equal to 6 mm, less than or equal to 5 mm, etc. from the sample well port 112. Specifically, the sample fluidic channel portion 130 may extend generally about a first radius 129 of about 4 mm from the sample well port 112. Similarly, the overflow fluidic channel portion 135 may extend generally about a second radius 136 of about greater than or equal to 4 mm, greater than or equal to 6 mm, greater than or equal to 8 mm, etc. and/or less than or equal to 15 mm, less than or equal to 12 mm, less than or equal to 10 mm, etc. from the sample well port 112. Specifically, the overflow fluidic channel portion 135 may extend generally about a second radius 136 of about 8.12 mm from the sample well port 112.

In some embodiments, the radial distance of the sample fluidic channel portion 130 and the overflow fluidic channel portion 135 (e.g., from the sample well port 112) may contribute to the effect of gravity on sample material 102 located in each of the sample fluidic channel portion 130 and the overflow fluidic channel portion 135. For example, the farther radially away from the sample well port 112 (e.g., the location at which sample material 102 may enter/exit the cartridge 100), the greater effect of gravity on the sample material 102. Therefore, in some embodiments, the overflow fluidic channel portion 135 may define a smaller cross-section (e.g., the channel depth 186 and the channel width 187) than the sample fluidic channel portion 130 to counteract the greater radial distance, which may result in a similar effect of gravity on the sample material 102 between the sample fluidic channel portion 130 and the overflow fluidic channel portion 135. In other words, the sample fluidic channel portion 130 and the overflow fluidic channel portion 135 may be designed such that the capillary action of each may offset gravity based on the radial distance from the sample well port 112.

A fluid drive port 160 may be positioned upstream (e.g., relative to the direction of pressure applied within the fluidic channel 120) of the reservoir port 152 and may be configured to be operably coupled to a pressure source (e.g., when the cartridge 100 is inserted into the instrument 12) to apply pressure within the fluidic channel 120 and move the sample material towards the reservoir port 152. As shown in FIG. 4, gas pressure applied through the fluid drive port 160 may travel towards the sample well port 112 or the fluidic channel 120. Due to the presence of the filter 140 (e.g., illustrated in FIG. 5) as described herein, gas from the fluid drive port 160 may not pass through the filter 140 (e.g., because of the bubble point of the filter 140) and, instead, may apply pressure within the fluidic channel 120 (e.g., applying a pressure on the sample material). Further, as described herein, any sample material present in the passage between the fluid drive port 160 and the sample well port 112 may be forced back through the filter 140 (therefore, this portion of sample material may be small and not delivered to the fluid reservoir).

As shown in FIG. 4, the fluidic channel membrane 104 may define a bottom surface of the fluidic channel 120. The fluidic channel membrane 104 may form a continuous surface along the bottom of the sample well port 112, the fluidic channel 120, and the overflow fluidic channel portion 135. Additionally, the fluidic channel membrane 104 is illustrated in FIG. 5 (e.g., a cross-sectional view of the cartridge 100 of FIG. 3 taken across line 5-5'). For example, the fluidic channel membrane 104 may be attached to a bottom of the cartridge body 110 to form a bottom surface of the fluidic channel 120. Also, as shown in FIG. 5, the filter 140 may be located between the sample well port 112 and the fluidic channel 120.

Illustrative embodiments are described and reference has been made to possible variations of the same. These and other variations, combinations, and modifications will be apparent to those skilled in the art, and it should be understood that the claims are not limited to the illustrative embodiments set forth herein.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method or the like, means that the components of the composition, product, method or the like are limited to the enumerated components and any other components that do not materially affect the basic and novel characteristic(s) of the composition, product, method or the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Any direction referred to herein, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

What is claimed is:

1. A cartridge comprising:
a cartridge body defining a capless sample well port configured to receive a sample material and a fluidic channel in fluid communication with the capless sample well port, wherein the fluidic channel comprises a first fluidic channel portion extending along a first axis and a second fluidic channel portion extending along a second axis, wherein the first axis is at an angle to the second axis, wherein the fluidic channel further comprises an overflow fluidic channel portion; and
a fluid reservoir, wherein the fluidic channel extends between the capless sample well port and the fluid reservoir, wherein the fluidic channel is configured to direct the sample material towards the fluid reservoir when a pressure is applied within the fluidic channel, and wherein the overflow fluidic channel portion is located upstream of a reservoir port of the fluid reservoir.

2. The cartridge of claim 1, further comprising a fluid drive port in fluid communication with the fluidic channel, wherein the fluid drive port is configured to be operably connected to a pressure source such that a positive pressure is applied within the fluidic channel to direct the sample material towards the fluid reservoir.

3. The cartridge of claim 1, wherein the first and second fluidic channel portions define a channel depth of less than or equal to 3 mm and a channel width of less than or equal to 3 mm.

4. The cartridge of claim 1, wherein the overflow fluidic channel portion defines a channel depth of less than or equal to 1.5 mm and a channel width of less than or equal to 3 mm.

5. The cartridge of claim 1, wherein the first and second fluidic channel portions extend generally about a first radius of less than or equal to 4 mm from the capless sample well port, and the overflow fluidic channel portion extends generally about a second radius of less than or equal to 8 mm from the capless sample well port.

6. The cartridge of claim 1, wherein the fluidic channel further comprises a third fluidic channel portion, wherein the first fluidic channel portion is parallel to the third fluidic channel portion, and wherein the second fluidic channel portion is perpendicular to the first and third fluidic channel portions.

7. The cartridge of claim 1, further comprising a filter positioned between the capless sample well port and the fluidic channel.

8. The cartridge of claim 1, wherein the first fluidic channel portion defines a first length and the second fluidic channel portion defines a second length, wherein the first and second lengths are each less than or equal to 10 mm.

9. The cartridge of claim 1, wherein the pressure applied within the fluidic channel is a negative pressure from the fluid reservoir.

10. A cartridge comprising:
a cartridge body defining a capless sample well port configured to receive a sample material and a fluidic channel in fluid communication with the capless sample well port, wherein the fluidic channel comprises a sample fluidic channel portion and an overflow fluidic channel portion, wherein the fluidic channel is configured such that an effect of gravity on the sample material within the sample fluidic channel portion does not overcome a capillary action of the fluidic channel; and
a fluid reservoir, wherein the fluidic channel extends between the capless sample well port and the fluid reservoir, wherein the fluidic channel is configured to direct the sample material towards the fluid reservoir when a pressure is applied within the fluidic channel, wherein a reservoir port of the fluid reservoir is positioned between the fluidic channel and the overflow fluidic channel portion.

11. The cartridge of claim 10, wherein the sample fluidic channel portion defines at least one bend such that the effect of gravity on the sample material within the sample fluidic channel portion does not overcome the capillary action of the fluidic channel.

12. The cartridge of claim 10, wherein a channel width and a channel depth of the fluidic channel defines the capillary action of the fluidic channel.

13. The cartridge of claim 10, further comprising a fluid drive port in fluid communication with the fluidic channel, wherein the fluid drive port is configured to be operably connected to a pressure source such that a positive pressure is applied within the fluidic channel to direct the sample material towards the fluid reservoir.

14. The cartridge of claim 10, wherein the sample fluidic channel portion defines a channel depth of less than or equal to 3 mm and a channel width of less than or equal to 3 mm.

15. The cartridge of claim 10, wherein the overflow fluidic channel portion defines a channel depth of less than or equal to 1.5 mm and a channel width of less than or equal to 3 mm.

16. The cartridge of claim 10, wherein the sample fluidic channel portion extends generally about a first radius of less than or equal to 4 mm from the capless sample well port, and the overflow fluidic channel portion extends generally about a second radius of less than or equal to 8 mm from the capless sample well port.

17. The cartridge of claim 10, further comprising a filter positioned between the capless sample well port and the fluidic channel.

18. The cartridge of claim 10, wherein the pressure applied within the fluidic channel is a negative pressure from the fluid reservoir.

* * * * *